(12) United States Patent
Sato

(10) Patent No.: US 11,630,565 B2
(45) Date of Patent: Apr. 18, 2023

(54) IMAGE PROCESSING APPARATUS, CONTROL METHOD FOR IMAGE PROCESSING APPARATUS, AND RECORDING MEDIUM FOR DISPLAYING A SCREEN WITH INVERTED COLORS

(71) Applicant: CANON KABUSHIKI KAISHA, Tokyo (JP)

(72) Inventor: Tomoya Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/385,777

(22) Filed: Jul. 26, 2021

(65) Prior Publication Data
US 2022/0035500 A1    Feb. 3, 2022

(30) Foreign Application Priority Data
Jul. 30, 2020  (JP) ............................. JP2020-129573

(51) Int. Cl.
G06F 3/0485  (2022.01)
G06F 3/0486  (2013.01)

(52) U.S. Cl.
CPC .......... G06F 3/0485 (2013.01); G06F 3/0486 (2013.01)

(58) Field of Classification Search
CPC .... G06F 3/0485; G06F 3/0486; G06F 3/0482; G06F 3/04883; G06F 3/0488; G06F 3/04845
See application file for complete search history.

(56) References Cited

U.S. PATENT DOCUMENTS

| | | | | |
|---|---|---|---|---|
| 2014/0071483 | A1* | 3/2014 | Urakawa | H04N 1/0035 358/1.15 |
| 2014/0380250 | A1* | 12/2014 | Yoshida | H04N 1/00456 715/863 |
| 2015/0268809 | A1* | 9/2015 | Horiike | G06F 3/0482 715/783 |
| 2016/0179322 | A1* | 6/2016 | Nagata | G06F 3/0485 715/784 |
| 2018/0246636 | A1* | 8/2018 | Horiike | H04N 1/00482 |

FOREIGN PATENT DOCUMENTS

JP        2015195005 A        11/2015

* cited by examiner

*Primary Examiner* — Ting Z Lee
(74) *Attorney, Agent, or Firm* — Canon U.S.A., Inc. IP Division

(57) ABSTRACT

An image processing apparatus having a color inversion function to perform color inversion of a screen displayed on a display unit having a touch panel function includes a determination unit configured to determine whether the color inversion function is enabled, and a control unit configured to control the screen to be scrolled according to a predetermined user operation of moving an instruction object in contact with the display unit in response to a determination by the determination unit that the color inversion function is not enabled, and to control the screen not to be scrolled according to the predetermined user operation in response to a determination by the determination unit that the color inversion function is enabled.

19 Claims, 12 Drawing Sheets

IMAGE PROCESSING APPARATUS, CONTROL METHOD FOR IMAGE PROCESSING APPARATUS, AND RECORDING MEDIUM FOR DISPLAYING A SCREEN WITH INVERTED COLORS

BACKGROUND

Field of the Disclosure

The present disclosure relates to an image processing apparatus, a control method for the image processing apparatus, and a recording medium.

Description of the Related Art

Recent popular image processing apparatuses have come with touch panels. These image processing apparatuses detect touch operations by users to switch a screen displayed on its display. Touch operations detected by the image processing apparatuses include a tap operation where the user touches the touch panel with an instruction object such as a fingertip or a touch pen and removes the instruction object off the touch panel without moving it on the touch panel, a drag operation to move the instruction object while keeping it in contact with the touch panel, a flick operation to touch the touch panel with the instruction object and then move it quickly as if to sweep the touch panel.

Japanese Patent Application Laid-Open No. 2015-195005 discusses a method of performing flick operations up and down on an address list on a displayed screen by a user to scroll the screen to move the address list in the direction of a flick operation to select a destination of image data on the list. Although, from among many addresses on an address list, some addresses are displayable on a screen, flick operations enables hidden addresses on the address list to be displayed. In addition, showing the user the smooth movement of the list in scrolling the screen means enhanced visibility, improved usability.

Moreover, some image processing apparatuses have the function of inverting colors on the screen displayed on the display in a universal design.

With the function of inverting colors on the screen enabled, the image processing apparatus performs processing of inverting colors every generating image data, with the processor under heavy load. As described above, showing the smooth movement of content in response to a flick or drag operation by a user carries processing of inverting colors while continuously generating image data in short periods. This can cause delayed processing by the processor to show the screen display being scrolled too sluggishly, which is irksome to the user.

SUMMARY

The present disclosure is directed to providing a method of displaying a screen in inverted color while keeping usability.

According to an aspect of the present disclosure, an image processing apparatus having a color inversion function to perform color inversion of a screen displayed on a display unit having a touch panel function includes a determination unit configured to determine whether the color inversion function is enabled, and a control unit configured to control the screen to be scrolled according to a predetermined user operation of moving an instruction object in contact with the display unit in response to a determination by the determination unit that the color inversion function is not enabled, and to control the screen not to be scrolled according to the predetermined user operation in response to a determination by the determination unit that the color inversion function is enabled.

Further features of the present disclosure will become apparent from the following description of exemplary embodiments with reference to the attached drawings.

BRIEF DESCRIPTION OF THE DRAWINGS

FIG. 7 is a flowchart illustrating processing executed by the image processing apparatus in detecting the press of an up or down arrow button according to.

DESCRIPTION OF THE EMBODIMENTS

Some exemplary embodiments of the present disclosure will be described below with reference to the drawings. The following exemplary embodiments do not limit the disclosure according to the claims, and not all combinations of the features described in the exemplary embodiments are used to the solution to the issues.

<Hardware Configuration of Image Processing Apparatus>

Figure 1:
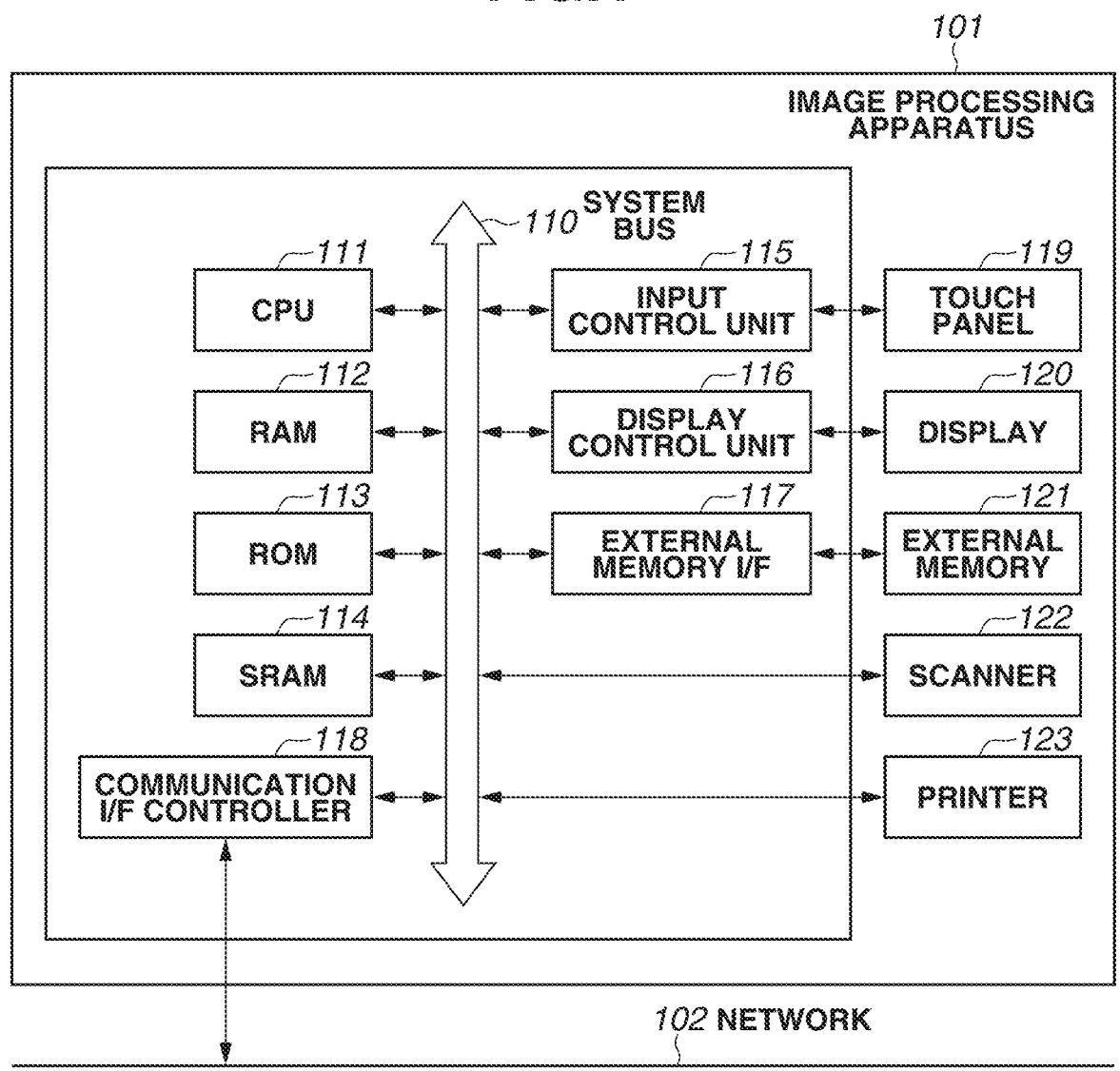
FIG. 1 is a diagram illustrating a hardware configuration of an image processing apparatus according to one or more aspects of the present disclosure.

A first exemplary embodiment will be described. FIG. 1 is a diagram illustrating a hardware configuration of an image processing apparatus 101 to which each exemplary embodiment of the present disclosure is applied. The image processing apparatus 101 is a multifunction peripheral (MEP) equipped with a plurality of functions, such as scan and print.

The image processing apparatus 101 includes the components indicated by the respective reference numbers 111 to 123. A central processing unit (CPU) 111, a random access memory (RAM) 112, a read only memory (ROM) 113, a static random access memory (SRAM) 114, an input control unit 115, a display control unit 116, an external memory interface (FE) 117, a communication I/F controller 118, a scanner 122, and a printer 123 are connected to a system bus 110. In addition, a touch panel 119, a display 120, and an external memory 121 are connected to the system bus 110 via an input control unit 115 and a display control unit 116, and the IT 117, respectively. Each processing unit is configured to exchange data with one another via the system bus 110.

The ROM 113 is a nonvolatile memory, and stores image data, other data, and various types of program for operation by CPU 111 in its respective predetermined areas. The RAM 112 is a volatile memory, and used as a temporary storage area such as a main memory of the CPU 111 and a work area. With the use of the RAM 112 as a work memory, the CPU 111 controls each component of this image processing apparatus 101 based on programs stored in the ROM 113. In one or more embodiments, programs for the CPU 111 to operate with are stored in advance in the external memory (hard disk, etc.) 121, other than the ROM 113. The SRAM 114 is a nonvolatile recording medium capable of high-speed operation. In the present exemplary embodiment, one CPU 111 executes the processing in each step illustrated in the flowchart described below with the use of one memory (the RAM 112, the external memory 121, etc.), but the configuration is not limited to this. In some embodiments, a plurality of CPUs, a plurality of RAMs, or an external memory are cooperatively used to execute the processing in each step.

The input control unit 115 receives user operations, generates control signals based on the operations, and supplies the control signals to the CPU 111. For example, the input control unit 115 receives user operations via a keyboard (not illustrated), a mouse (not illustrated), and the touch panel 119, which function as input devices. The touch panel 119 is an input device configured to output coordinate information corresponding to the position at which an instruction object contacts the input control unit in two dimensions or three dimensions, for example. The CPU 111 receives control signals generated by the input control unit 115 in response to user operations on the input device. This allows the image processing apparatus 101 to perform operations in response to the user operations.

The display control unit 116 outputs display signals for displaying screens on the display 120. For example, the CPU 111 supplies display control signals generated based on programs to the display control unit 116. The display control unit 116 generates display signals based on the display control signals and outputs the display signals to the display 120.

The touch panel 119 is integrated with the display 120 to function as an operation unit and a display unit. For example, the touch panel 119, which is configured in such a manner that the light transmission does not interfere with the display 120's displaying, is added to the upper layer of the display surface of the display 120. The input coordinates on the touch panel 119 are associated with the display coordinates on the display 120. This offers a graphical user interface (GUI) that allows a user to directly operate the screen displayed on the display 120.

The external memory LIF 117 is an interface for exchanging information with an external memory 121, such as a hard disk, a floppy disk, a compact disc (CD), a digital versatile disc (Mit)), or a memory card. The external memory 117 reads or writes data from or to the attached external memory 121 based on the control by the CPU 111. The communication I/F controller 118 is an interface for establishing connection with various networks 102, such as a local area network (LAN) based on the control by the CPU 111. A variety of devices, such as PCs (personal computers), other MFPs, printers, and servers, are connected to the network 102 in communication with the image processing apparatus 101.

The scanner 122 reads a document to generate the image data. The printer 123 executes printing processing based on a user instruction input via the input control unit 115 and a command input on an external apparatus via the communication I/F controller 118.

The CPU 111 functions as a unit for identifying a user's operation, and identifies a touch operation on the touch panel 119 and the touch condition. Touch operations identifiable by the CPU 111 include a user's touch to the touch panel with an instruction object such as a finger or a pen (hereinafter referred to as "press"), a movement of the instruction object in contact with the touch panel (hereinafter referred to as "movement"), and a removal of the instruction object off the touch panel by a user (hereinafter referred to as "removal"). In addition, the CPU 111 determines a user's operation by identifying a combination of a press, movement, removal as described above. Touch operations include a tap operation of touching the touch panel, for example, with an instruction object and then removing it off without movement of it beyond a predetermined distance, and a drag operation of pressing the touch panel with an instruction object, moving it on the touch panel, and then removing it off. In addition, the CPU 111 also identifies a flick operation of pressing the touch panel with an instruction object, moving it a predetermined distance in a quick sweep motion, and removing it off.

The touch panel 119 may use any touch panel function among various methods, such as a resistive film method, a capacitive method, a surface acoustic wave method, an infrared method, an electromagnetic induction method, an image recognition method, and an optical sensor method.

The image processing apparatus 101 stores image data in the RAM 112 or the external memory 121. For example, the image processing apparatus 101 stores image data generated through reading a document by the scanner 122, in the RAM 112 or the external memory 121. In addition, the image processing apparatus 101 stores image data received from an external apparatus, such as a PC, in connection with the network 102 via the communication I/F controller 118, in the RAM 112 or the external memory 121. Furthermore, the image processing apparatus 101 stores image data received from an attachable and removable storage medium (a USB memory, a memory card, etc.) attached to the external memory I/F 117, in the RAM 112 or the external memory 121. Otherwise, the image processing apparatus 101 may store image data in the RAM 112 or the external memory 121 by another storage method. In one or more embodiments, data corresponding to various settings, such as print settings, is stored in the RAM 112 or the external memory 121.

The image processing apparatus 101 supports two display modes: a normal display mode of displaying a screen with standard color information, namely with no color inversion processing, and a color inversion display mode of displaying a screen with inverted colors. The color inversion display mode offers inverted display color screens to users with color blindness to improve visibility of the type of user.

Figure 3A:
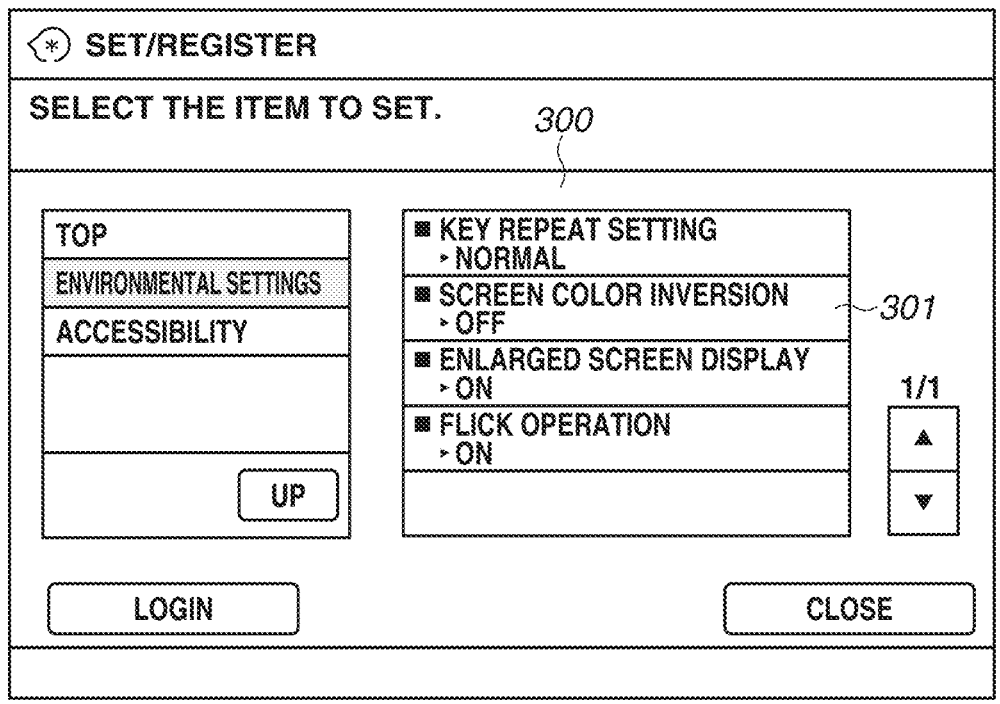
FIGS. 3A and B are examples of a color inversion setting screen of the image processing apparatus according to one or more aspects of the present disclosure.
Figure 3B:
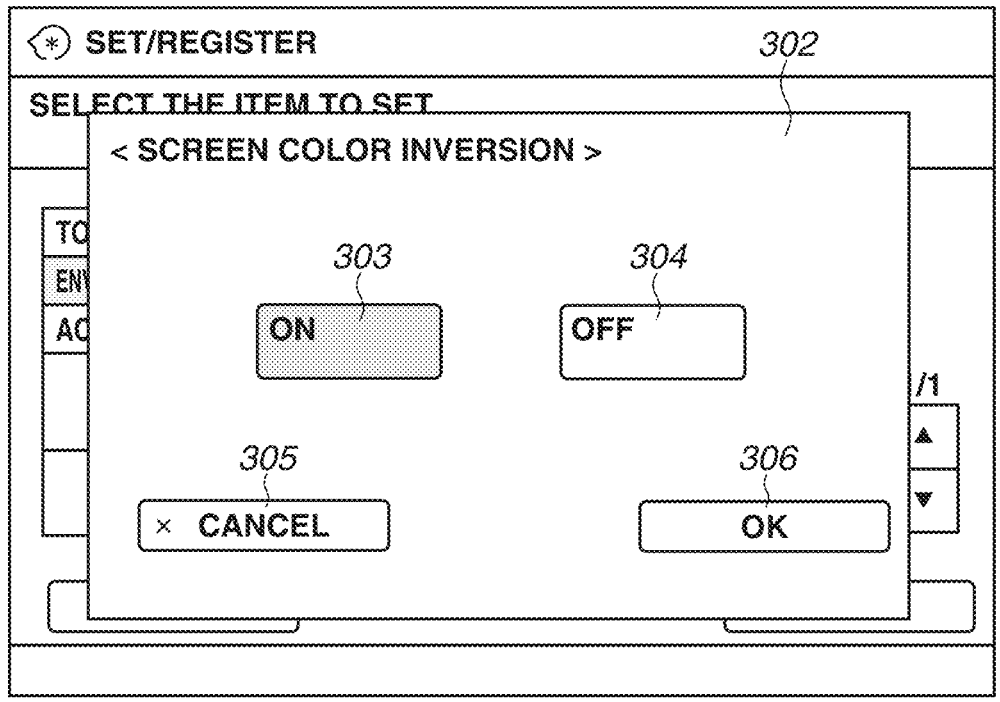

A method will be described by which a user switches between the normal display mode and the color inversion display mode, that is, a method of enabling or disabling the screen color inversion function with reference to FIGS. 3A and 3B, FIGS. 3A and 3B illustrates an example of the screens displayed on the display 120 when the user enables or disables the screen color inversion function.

FIG. 3A illustrates an example of a setting screen for making settings common to all the functions of the image processing apparatus 101 displayed on the display 120 of the image processing apparatus 101. A "SET/REGISTER" screen 300 displays setting items common to all the functions of image processing apparatus 101, such as screen display settings and operation input settings.

The screen illustrated in FIG. 3B is a "SCREEN COLOR INVERSION SETTING" screen 302 displayed on the display 120 in response to a tap of a "SCREEN COLOR INVERSION" button 301 on the "SET/REGISTER" screen 300, The screen color inversion setting is set to OFF as the initial setting (e.g., the factory default setting), and the setting value is stored in the ROM 113. In other words, with the screen color inversion setting set to OFF, the screen is displayed with standard color information as illustrated in FIG. 2 (here, the background color is white).

The "SCREEN COLOR INVERSION SETTING" screen 302 is a screen to set screen color inversion to "ON" or "OFF". When the user taps an "ON" button 303 and then taps an "OK" button 306, screen color inversion is enabled. When the user taps an "OFF" button 304 and then taps the "OK" button 306, screen color inversion is disabled, A "CANCEL" button 305 is a button that, when pressed, closes the "SCREEN COLOR INVERSION SETTING" screen 302 without reflecting the setting. When the CPU 111 detects a tap operation on the "OK" button 306, the setting value of "ON" or "OFF" of the screen color inversion set in the "SCREEN COLOR INVERSION SETTING" screen 302 is stored in the RAM 112. If screen color inversion is enabled, a screen on which normal color information is inverted is displayed, as illustrated in the screen in FIG. 4 (here, the background color is black).

In the present exemplary embodiment, with screen color inversion enabled, the color-inverted screen displayed on the display 120 is controlled not to be scrolled even when a flick operation or a drag operation by the user is received on the scrollable screen. On the other hand, with screen color inversion disabled, the screen with normal color information displayed thereon is controlled to allow scrolling by flick or drag operations.

Hereinafter, scrolling refers to displaying some part of the content in a predetermined screen or window through the movement of it in response to a user operation into the predetermined screen or window, from among the part of the content not displayed in the predetermined screen area or window. In other words, screen scrolling means a change from a screen on which no predetermined content is displayed to a screen on which the predetermined content is displayed.

In addition, a screen being scrolled is a screen being displayed while scrolling, that is, while the content is moving. For example, the image processing apparatus 101 renders screens in set predetermined time intervals (frame rate). With a frame rate of 30 fps (frame per second), a screen is rendered 30 times per second. The display of continuous different screens allows the smooth movement of content to be represented. As described above, the screen displayed to represent the movement of content while continuously switching screens is called the screen being scrolled.

The display of the screen in response to a flick or drag operation received from the user with screen color inversion disabled will be described with reference to FIGS. 2A to 2D. The following is a description of an example of a setting screen for setting an address to transmit image data generated through a scan by the image processing apparatus 101, FIGS. 2A-2D illustrate screens displayed on the display 120 with screen color inversion disabled.

Figure 2A:
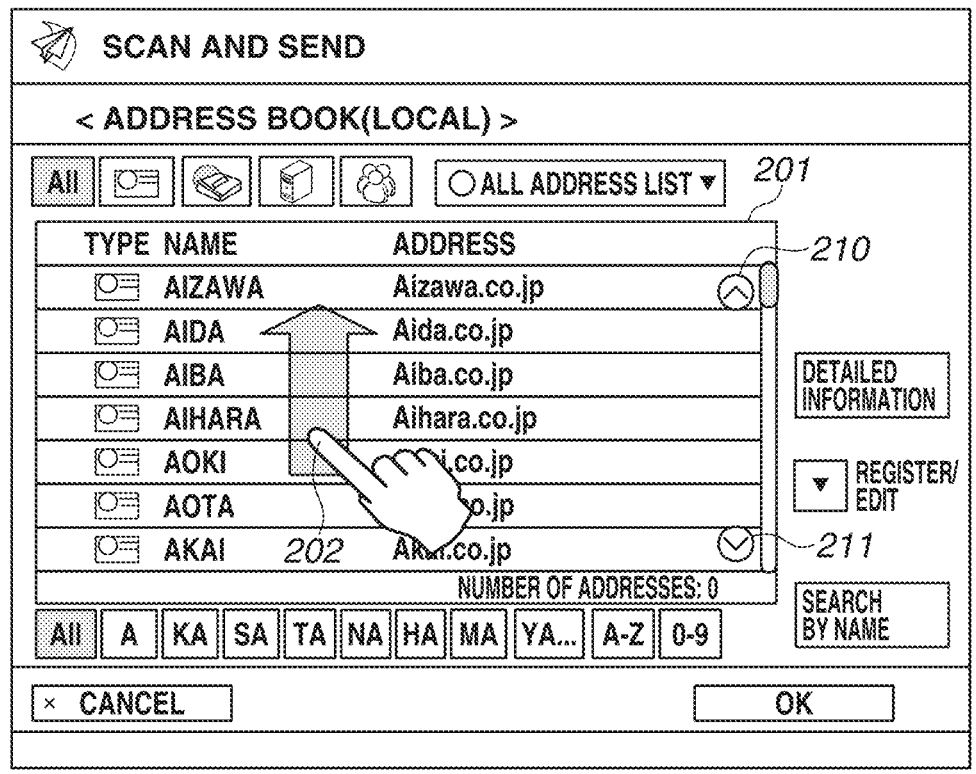
FIGS. 2A-2D are examples of screens displayed on a display of the image processing apparatus according to one or more aspects of the present disclosure.

FIG. 2A illustrates a screen displayed on the display 120 when the user selects a "SCAN AND SEND" button on the menu screen of the imaae processing apparatus 101 and presses the button for calling the "Address Book" to select a destination of image data. The address book is stored in the external memory 121 or another memory of the image processing apparatus 101 or in an apparatus in connection with the image processing apparatus 101 via a network.

An address display area 200 is an area where addresses contained in the called "Address Book" are displayed in a list format. If the address book contains a large number of addresses, all the addresses are not displayed in the address display area 200. Scrolling the screen by flick or other operations on the address display area 200 by the user allows hidden part of the list to be displayed.

Figure 2B:
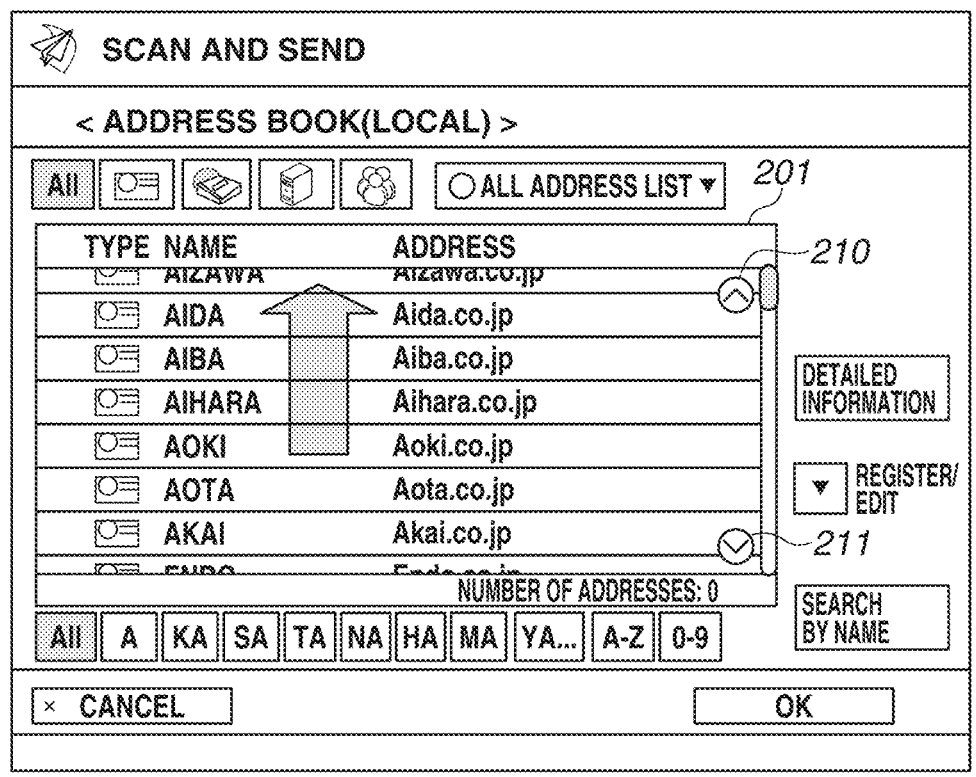

A flick operation 202 in the upward direction by the user as illustrated in FIG. 2A moves the displayed list in the upward direction. FIG. 2B illustrates an example of a screen being scrolled in response to a receipt of the flick operation 202. Part of the row of "AIZAWA", which had been displayed at the top of the list in FIG. 2A, is now hidden at the top, and instead, part of the row of "ENDO", which had not been displayed in FIG. 2A, is now displayed in the address display area 200. Here, instead of processing the movement of the list in units of pages or lines in response to the flick operation, the list is smoothly moved and displayed in units of pixels in response to the flick operation as illustrated in FIG. 213, The screen being scrolled in FIG. 2B is an example, and all of the different screens displayed in succession to represent how the list moves from the start to the end of the scrolling refers to a screen being scrolled.

Figure 2C:
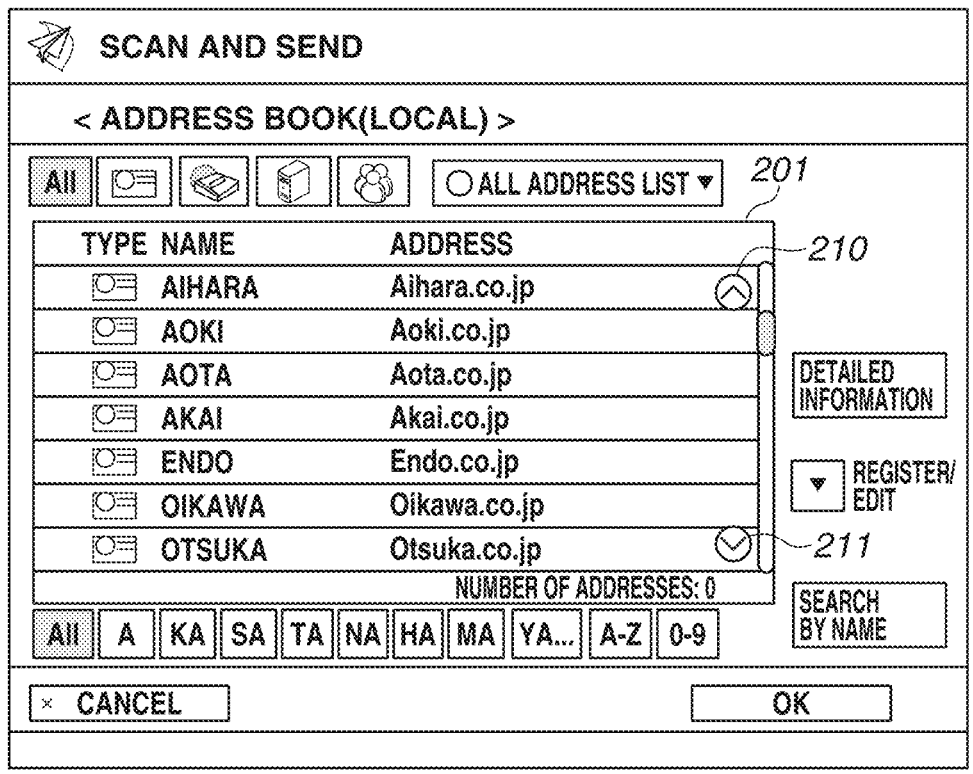

FIG. 2C illustrates a screen after scrolling the screen is complete in response to the flick operation received in the screen of FIG. 2A. While the part of the list from "AIZAWA" to "AIBA", which had been displayed in FIG. 2A, is now undisplayed, the part of the list from "ENDO" to "Otsuka", which had not been displayed in FIG. 2A, is now displayed.

In addition, operations other than flick operations can issue an instruction to perform screen scrolling. For example, a drag operation in the address display area 200 by the user causes a screen to be scrolled while the screen being scrolled is displayed. A drag operation is an operation of pressing the touch panel 119 with an instruction object, moving the instruction object a predetermined distance or more, and then removing it off the touch panel 119.

Figure 2D:
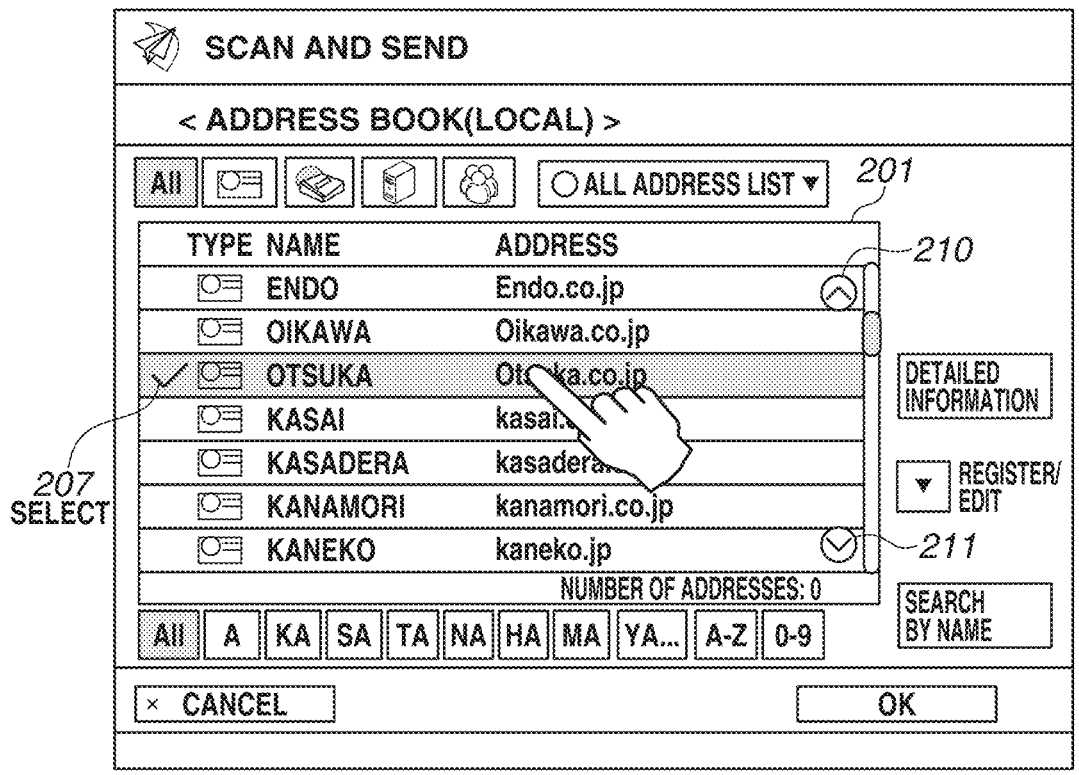

In addition, the screen also is scrollable by the user pressing an up arrow button 210 or a down arrow button 211 displayed on the display 120. For example, when the user presses the down arrow button 211 in the screen of FIG. 2A, one page's worth of the list is turned (this screen displays a list of seven entries, which means that seven entries are contained in one page). In other words, the list of "AIZAWA" to "AKAI", which had been displayed in the address display area 200 in FIG. 2A, are now changed to the next list of seven entries of "ENDO", following the entry of "AKAI", to "KANEKO" as illustrated in FIG. 2D. A press of the up arrow button 210 or the down arrow button 211 also causes the screen being scrolled in FIG. 2B to be displayed. The methods of scrolling the screen are not limited to these methods.

With screen color inversion disabled as described above, in response to a receipt of an operation of scrolling the screen from the user, the screen is scrolled while the screen being scrolled is displayed. This allows the user to intuitively recognize the screen change in response to the users operation. In addition, with screen color inversion disabled, the CPU 111 generates image data and represents the display of it on the screen being scrolled; the processing load on the CPU 111 is not high.

As illustrated in FIG. 2D, the user selects an address from the list by a tap operation on the row in the part of the list displayed in the address display area 200. A check mark 207 is placed in the row of the address. This selection allows the image processing apparatus 101 to transmit image data to the address corresponding to the selected row of the list.

Figure 4A:
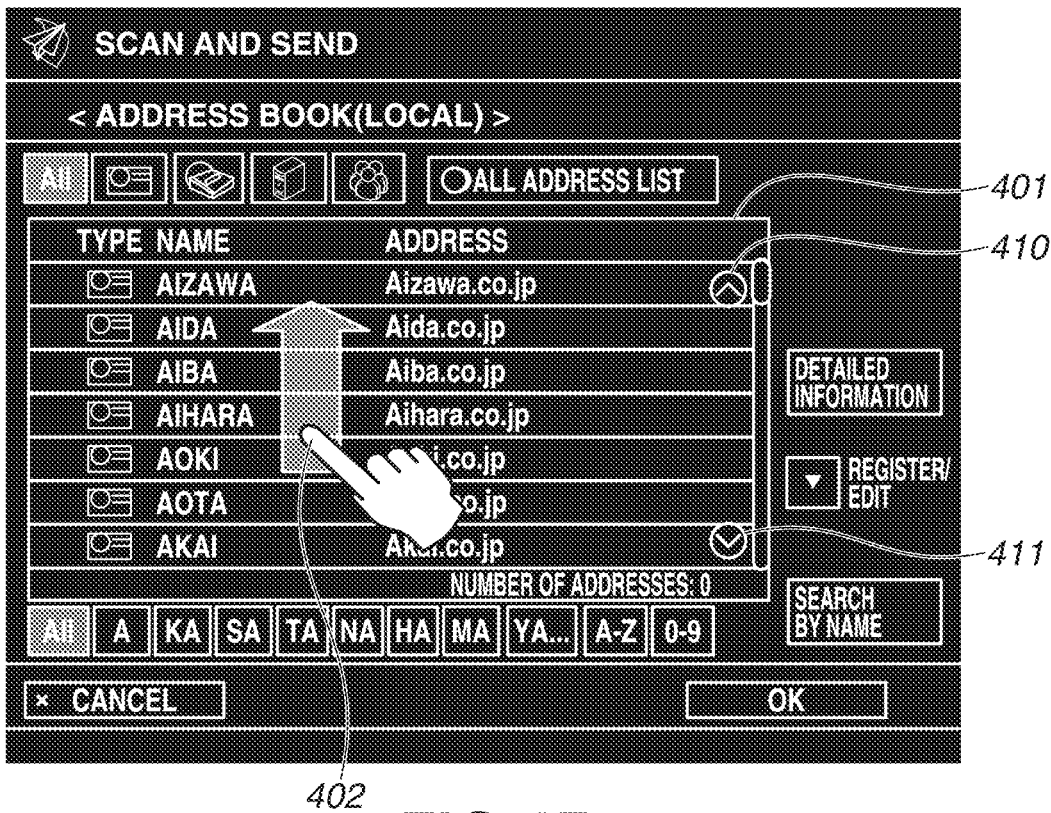
FIGS. 4A and B are examples of a screen in a screen color inversion state displayed on the display of the image processing apparatus according to one or more aspects of the present disclosure.
Figure 4B:
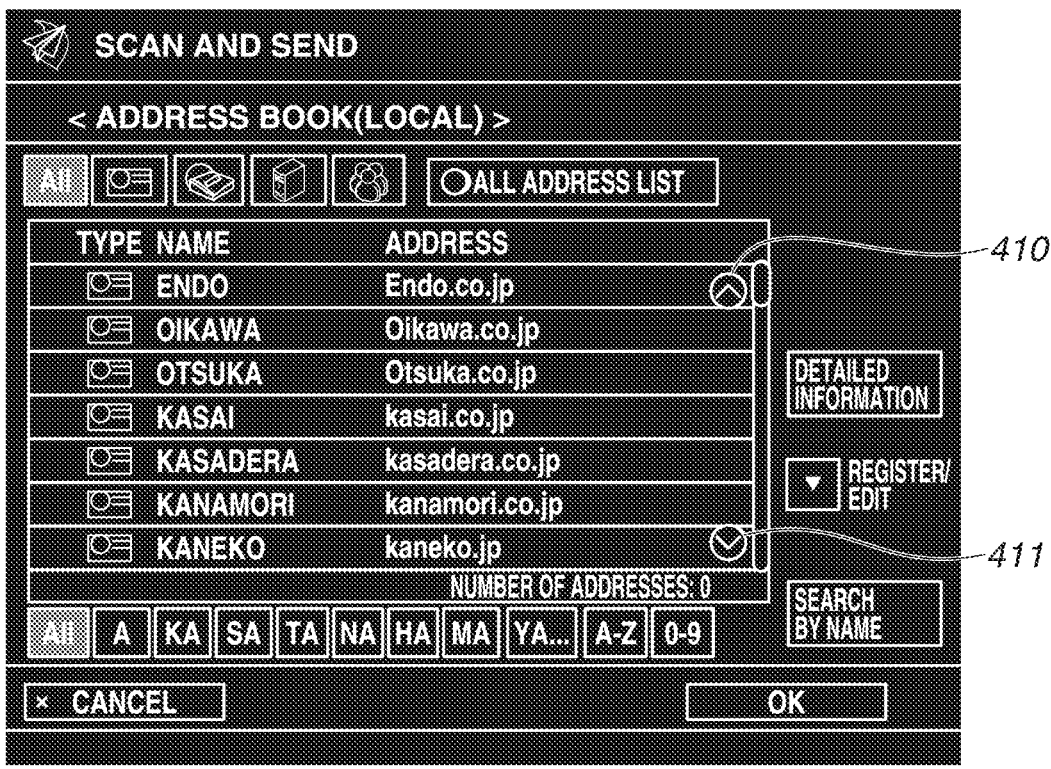

The following is a description of a screen displayed in response to a receipt of a flick or drag operation by the user with reference to FIGS. 4A and 4B. As with the example of FIG. 2, an example will be described of a screen for selecting a destination of image data. FIGS. 4A and 4B illustrate screens displayed on the display 120 with screen color inversion enabled.

FIG. 4A illustrates a screen displayed in response to an upward flick operation 402 on an address display area 401 by the user. It is assumed that the address display area 401 corresponds to the address display area 201 in FIG. 2, and that the flick operation 402 also corresponds to the flick operation 202 in FIG. 2, With screen color inversion enabled, even the upward flick operation by the user does not cause the screen to be scrolled or the screen being scrolled as illustrated in FIG. 2 to be displayed. In other words, what are displayed here in the address display area 401 is not changed between ones before and after the upward flick operation. Similarly, a drag operation on the address display area 401 received by the user does not cause the screen to be scrolled or the screen being scrolled to be displayed.

FIG. 4B illustrates a screen displayed in response to a press of a down arrow button 411 of FIG. 4A by the user. In the screen of FIG. 4B, one page's worth of the list that contains the entries of "AIZAWA" to "AKAI", which had been displayed in the screen of FIG. 4A, is now hidden. On the other hand, the next one page's worth of the list, which has been hidden in the screen of FIG. 4A, that is, the list of "ENDO" to "KANEKO", is now displayed. That means that the screen is changed similarly to the screen change from the screen of FIG. 2A to the screen of FIG. 2D excluding that a screen being scrolled (e.g., the screen of FIG. 2B) is not displayed unlike the case illustrated in FIG. 2A to 2D. The screen in FIG. 4A is changed to the screen in FIG. 4B at a time.

Figure 5:
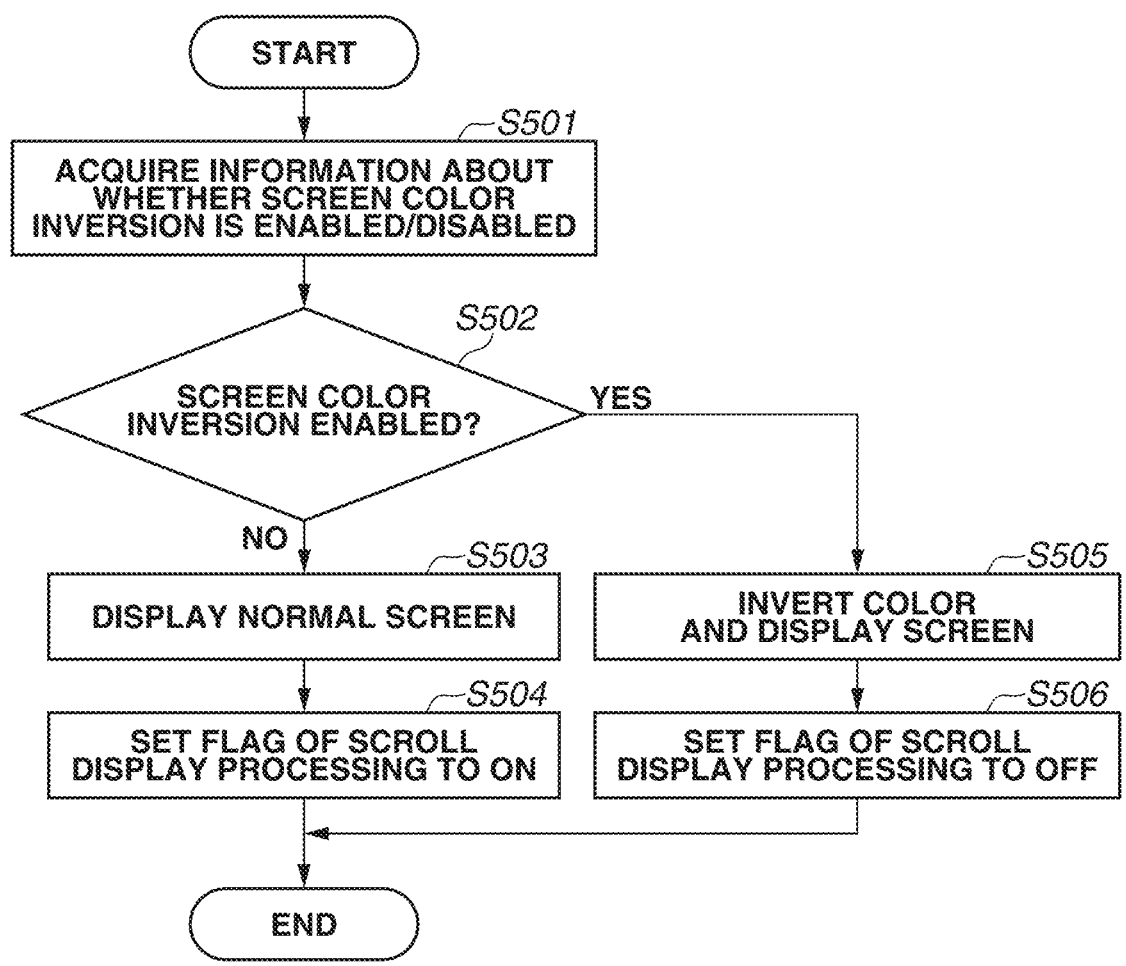
FIG. 5 is a flowchart illustrating processing executed by the image processing apparatus in displaying a screen on the display according to one or more aspects of the present disclosure.

As described above, with screen color inversion enabled, the screen is not scrolled by a flick or drag operation. Meanwhile, the screen is scrollable in units of pages with the up arrow button 410 and the down arrow button 411, with no display of the screen being scrolled. This is because displaying a screen being scrolled with screen color inversion enabled involves a series of pieces of processing of the CPU 111's generating image data to be displayed, inverting colors, and representing it, in other words, the screen being scrolled displayed with screen color inversion enabled entails heavy processing load on the CPU 111, causing the operation of representing the movement of content to get sluggish. That is why the scroll being scrolled is not displayed FIG. 5 is a flowchart illustrating processing executed by the image processing apparatus 101 to display a screen including a scrollable area (e.g., the screens illustrated in FIGS. 2 and 4) on the display 120. Each of the steps of FIG. 5 is implemented by the CPU 111 executing one or more programs stored in the ROM 113 or the external memory 121.

In step S501, the CPU 111 acquires setting information about whether screen color inversion is enabled or disabled from the RAM 112. The setting information acquired here is a value set in the "SCREEN COLOR INVERSION SETTING" screen 302 illustrated in FIG. 3B.

In step S502, the CPU 111 determines whether screen color inversion is enabled, based on the setting information acquired in step S501. In step S502, if it is determined that screen color inversion is not enabled (No in step S502), the processing proceeds to step S503, and the CPU 111 displays a normal screen without color inversion, on the display 120. In step S503, the CPU 111 transmits a display control signal to the display control unit 116. The display control unit 116 generates screen data to be displayed and displays the screen data on the display 120 based on the signal received from the CPU 111, The screen illustrated on the display 120 in step S503 is, for example, the screen illustrated in FIG. 2. Then, in step S504, the CPU 111 sets a flag indicating ON/OFF of the scroll display processing on the screen displayed in step S503 to ON, and ends the processing described in this flowchart. The set flag information is stored in the RAM 112.

In step S502, if it is determined that screen color inversion is enabled (Yes in step S502), in step S505, the CPU 111 displays the screen subjected to color inversion processing, on the display 120. The screen displayed on the display 120 in step S505 is a screen whose colors are inverted from the screen in the normal mode, as illustrated in FIG. 4 as an example. Then, in step S506, the CPU 111 sets a flag indicating ON/OFF of the scroll display processing on the screen displayed in step S505 to OFF, and ends the processing described in this flowchart. The set flag information is stored in the RAM 112.

Figure 6:
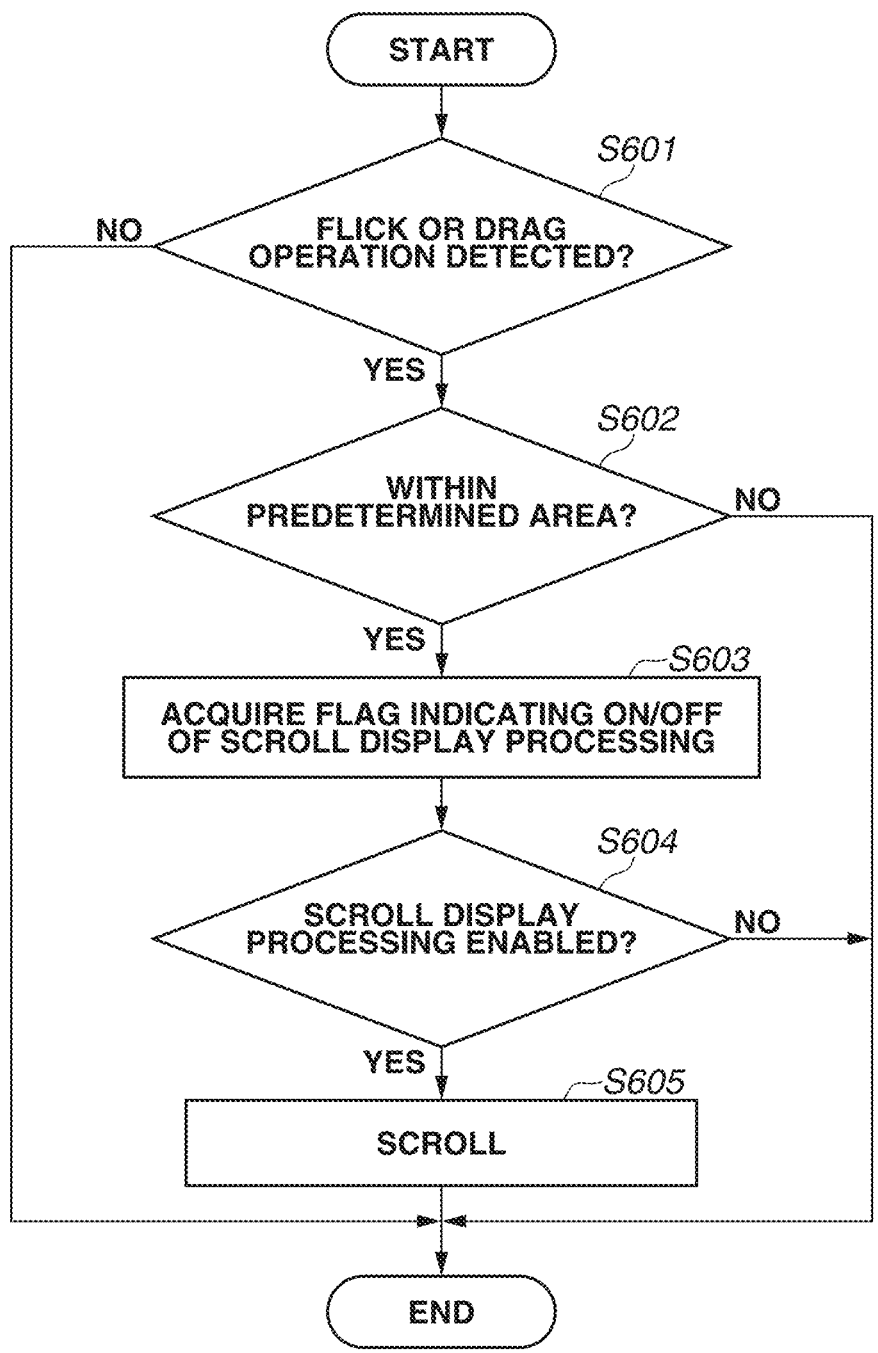
FIG. 6 is a flowchart illustrating processing executed by the image processing apparatus in detecting a touch operation according to one or more aspects of the present disclosure.

FIG. 6 is a flowchart illustrating processing executed in response to a detection by the CPU 111 of a receipt of a touch operation on the touch panel 119. Each of the steps of FIG. 6 is implemented by the CPU 111 executing one or more programs stored in the ROM 113 or the external memory 121.

In step S601, the CPU 111 determines that the received touch operation is a flick or drag operation (that is, it is determined whether it is detected that an instruction object such as a finger or a pen has moved after touching the touch panel 119). If it is determined that the operation is a flick or drag operation (Yes in step S601), the processing proceeds to step S602, otherwise (No in step S601), proceeds to the flowchart of FIG. 7 described below.

In step S602, the CPU 111 determines whether the received operation is within a predetermined area. The predetermined area is an area where the screen is scrollable, and the address display area 201 in FIG. 2 and the address display area 401 in FIG. 4 correspond to the predetermined area. In step S602, if it is determined that the area is a predetermined area (Yes in step S602), that is, a scrollable area, the processing proceeds to step S603, otherwise (No in Step S602), the processing ends.

In step S603, the CPU 111 acquires a flag indicating ON/OFF of the scroll display processing stored in the RAM 112. In other words, the CPU 111 acquires the flag set in step S504 or S506.

Next, in step S604, the CPU 111 determines whether the scroll display processing is enabled with reference to the flag acquired in step S603. If the scroll display processing is enabled (Yes in step S604), in step S605, the CPU 111 scrolls the screen while displaying the screen being scrolled, according to the received flick or drag operation, and ends the processing.

In step S604, if the scroll display processing is disabled (No in step S604), the CPU 111 does not scroll the screen according to the received flick or drag operation, and ends the processing.

In the processing in the above flowchart, with screen color inversion enabled, the screen being scrolled is not displayed even when the user performs an operation (flick or drag operation) that instructs the screen to be scrolled. On the other hand, with screen color inversion disabled, when a flick or drag operation is received, the screen is scrolled while displaying the screen being scrolled. The example has been described of detecting a flick or drag operation in step S601 even with the scroll display disabled. In one or more embodiments, with the scroll display disabled, a flick or drag operation is not be detected.

In the processing illustrated in the above flowchart, in response to an instruction of an operation of scrolling the screen by the user with screen color inversion enabled, the screen is not scrolled, preventing an issue that the movement of scrolling the screen while displaying the screen being scrolled gets sluggish from arising.

Figure 7:
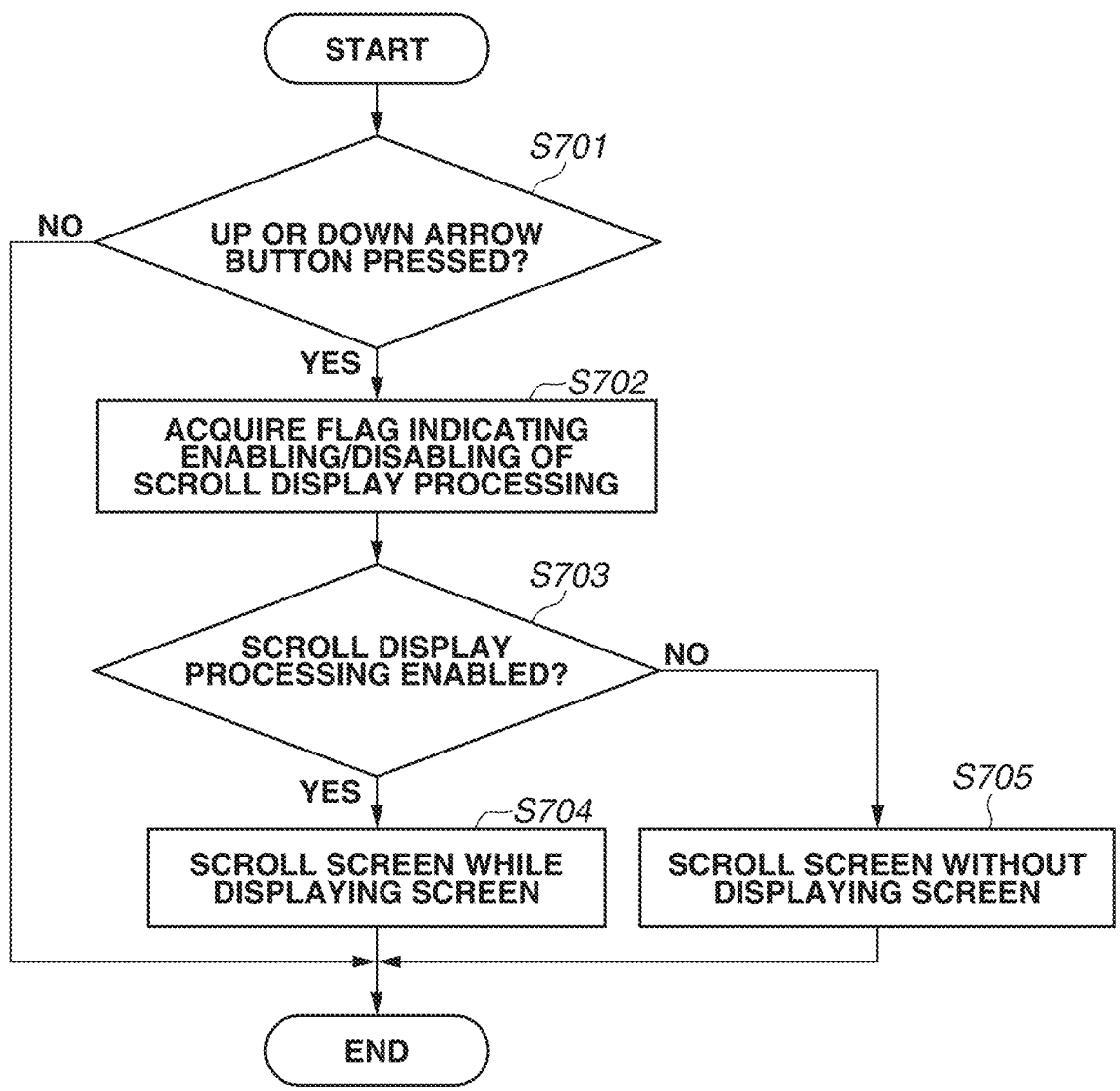

FIG. 7 is a flowchart illustrating processing executed in response to the CPU 111's detection of receiving a touch operation on the touch panel 119, and the processing is executed in response to a determination in step S601 of FIG. 6 that the touch operation is not a flick operation or a drag operation. Each of the steps of FIG. 7 is implemented by the CPU 111 executing one or more programs stored in the ROM 113 or the external memory 121.

In step S701, the CPU 111 determines whether the up or down arrow button is pressed. Specifically, the CPU 111 acquires from the touch panel 119 information indicating the position pressed on the touch panel 119, which is a touch position. The CPU 111 determines whether the touch position is on the up or down arrow button based on the position information acquired from the touch panel 119. In step S701, if it is determined that the up or down arrow button is pressed (Yes in step S701), the processing proceeds to step S702, otherwise (No in step S701), the CPU 111 ends the processing.

In step S702, the CPU 111 acquires a flag indicating enabling/disabling of the scroll display processing stored in the RAM 112. Specifically, the CPU 111 acquires the flag set in step S504 or S506.

Next, in step S703, the CPU 111 determines whether the scroll display processing is enabled with reference to the flag value acquired in step S702. If the scroll display processing is enabled (Yes in step S703), the CPU 111 scrolls the screen while displaying the screen being scrolled in step S704. The screen here is scrolled while the list displayed in the address display area 200 moves smoothly as the change from FIG. 2A to FIG. 2D, and then the processing ends.

If it is determined that the scroll display processing is disabled in step S703 (No in step S703), the screen is switched without displaying the screen being scrolled. In other words, one page's worth of the list displayed in the address display area 400 is turned instantaneously, as the screen change from the screen of FIG. 4A to the screen of FIG. 4B.

In the processing illustrated in the above flowchart, in response to a receipt of an operation of instructing the screen to be scrolled by the user with screen color inversion disabled, the screen is scrolled while displaying the screen being scrolled. This allows the user to intuitively identify which direction the list is moving by scrolling of the screen. Meanwhile, in response to a receipt of an operation of instructing the screen to be scrolled by the user with screen color inversion enabled, the screen is scrolled without displaying the screen being scrolled. Displaying the screen being scrolled with screen color inversion enabled entails increase in processing load on the CPU, causing the movement to get sluggish. This slows the response to user operations, degrading usability. Thus, with screen color inversion enabled, the screen being scrolled is not displayed.

A second exemplary embodiment will be described. In the first exemplary embodiment, with screen color inversion enabled on the image processing apparatus 101, the screen is not scrolled or the screen being scrolled is not displayed to prevent the processing load on the CPU from increasing to cause the movement to become sluggish. However, some image processing apparatuses are equipped with a graphics processing unit (GPU) that provides high speed processing on the screen display. In the present exemplary embodiment, an example will be described in which the screen is scrolled and the screen being scrolled is displayed even with screen color inversion enabled in the image processing apparatus equipped with a GPU, The basic configuration of the second exemplary embodiment is the same as the basic configuration of the first exemplary embodiment, and thus the differences will be described.

Figure 8:
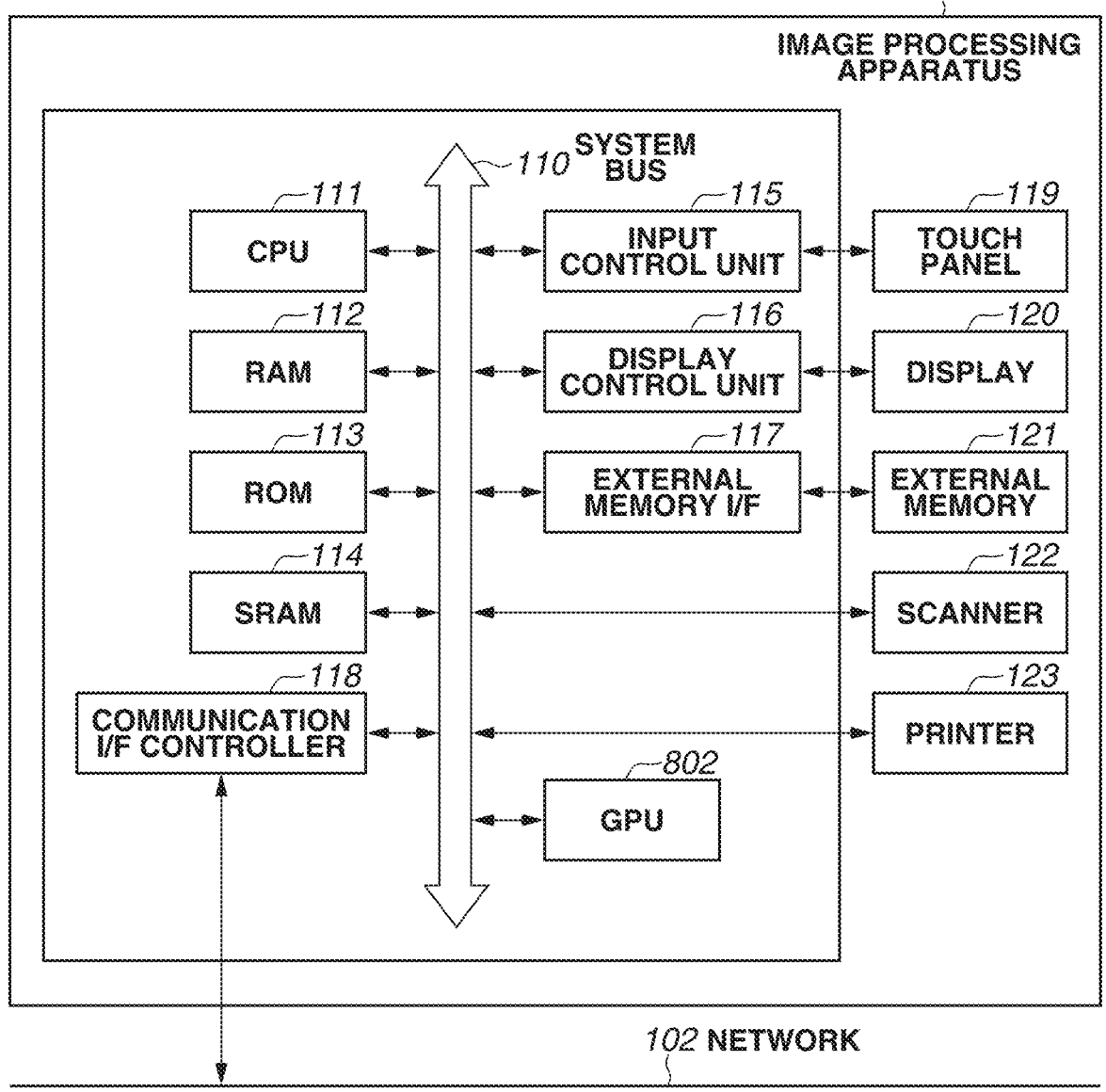
FIG. 8 is a diagram illustrating a hardware configuration of an image processing apparatus according to one or more aspects of the present disclosure.

FIG. 8 is a diagram illustrating a hardware configuration of an image processing apparatus 801 according to the second exemplary embodiment. In addition to the same configuration as the configuration of the image processing apparatus 101, the image processing apparatus 801 further includes a GPU 802 connected to the system bus 110. The GPU 802 is an arithmetic unit specializing in screen display, and generates display control signals to display a screen on the display 120 in cooperation with the CPU 111. An image processing apparatus equipped with a GPU offers high speed screen color inversion processing, and keeps the movement of content while displaying the screen being scrolled even with the screen color inversion setting enabled.

Figure 9:
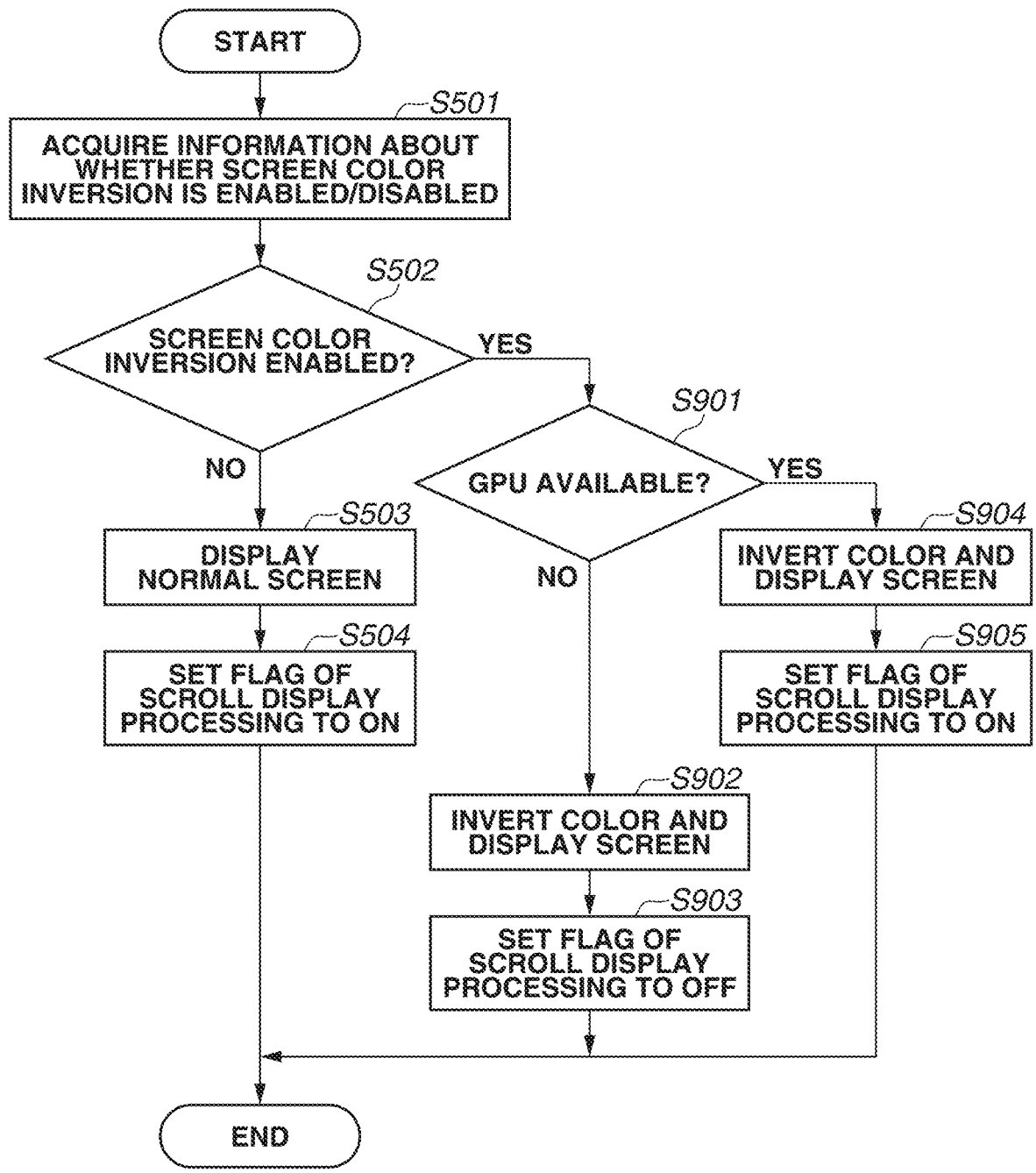
FIG. 9 is a flowchart illustrating processing executed by the image processing apparatus in displaying a screen on the display according to one or more aspects of the present disclosure.

FIG. 9 is a flowchart illustrating processing executed by the image processing apparatus 101 or 801 to display a screen including a scrollable area (e.g., the screens illustrated in FIGS. 2 and 4) on the display 120. Each of the steps of FIG. 9 is implemented by the CPU 111 executing one or more programs stored in the ROM 113 or the external memory 121. The flowchart in FIG. 9 has the same basic sequence as the basic sequence of the flowchart in FIG. 5, and thus the differences will be described.

If it is determined that screen color inversion is enabled in step S502, the processing proceeds to step S901. In step S901, the CPU 111 determines whether the GPU of the apparatus the CPU 111 is included in is available. If it is determined that the GPU is available (Yes in step S901), the processing proceeds to step S904, otherwise (No in step S901), proceeds to step S902. In response to a notification from each component connected to the system bus 110 while the image processing apparatus 101 or 801 is starting, the CPU 111 stores the notification in the RAM 112 as system configuration information. The CPU 111 determines whether the GPU is available based on the information. In the present exemplary embodiment, it is determined that the GPU is available on the image processing apparatus 101 including the GPU, and it is determined the GPU is unavailable on the image processing apparatus 101 not including the GPU. However, other configurations are employable. In one or more embodiments, the GPU included in the image processing apparatus 101 is set to be enabled or disabled and the GPU is determined to be available with the GPU enabled. Here, with the GPU included in the image processing apparatus 801 enabled, the processing proceeds to step S904, and for the image processing apparatus 101, the processing proceeds to step S902. The processing of steps S902 to S903 are the same as that of steps S505 to S506, and thus the description will be omitted.

In step S904, the CPU 111 displays a color inverted screen. To do that, the CPU 111 requests the GPU 802 to perform screen color inversion processing, and in response to the request, the GPU 802 performs screen color inversion processing. The screen displayed is the same as the one displayed in step S905 (e.g., the screen illustrated in FIG. 4), but differs in that at least part of the processing is executed by the GPU 802. Then, in step S906, the CPU 111 sets a flag indicating ON/OFF of the scroll display processing to ON, and ends the processing described in this flowchart.

In the second exemplary embodiment, the processing executed by the CPU 111 in response to a detection of a touch operation on the touch panel 119 from the user is as illustrated in FIGS. 6 and 7.

In other words, in the second exemplary embodiment, even if the screen color inversion in an image processing apparatus including an available GPU is enabled, the screen is scrolled and the screen being scrolled is displayed in response to an operation instructing the screen to be scrolled from a user.

Thus, on an image processing apparatus that keeps the movement of content on a color inverted screen being scrolled, the display of the screen being scrolled leads to higher usability.

A third exemplary embodiment will be described. In the first exemplary embodiment, with screen color inversion enabled, the screen is not scrolled even for a received flick or drag operation. In the third exemplary embodiment, an example will be described of notifying the user that screen scrolling is disabled in response to a flick or drag operation with screen color inversion enabled. The basic configuration of the third exemplary embodiment is the same as the basic configuration of the first exemplary embodiment, and thus the differences will be described.

Figure 10:
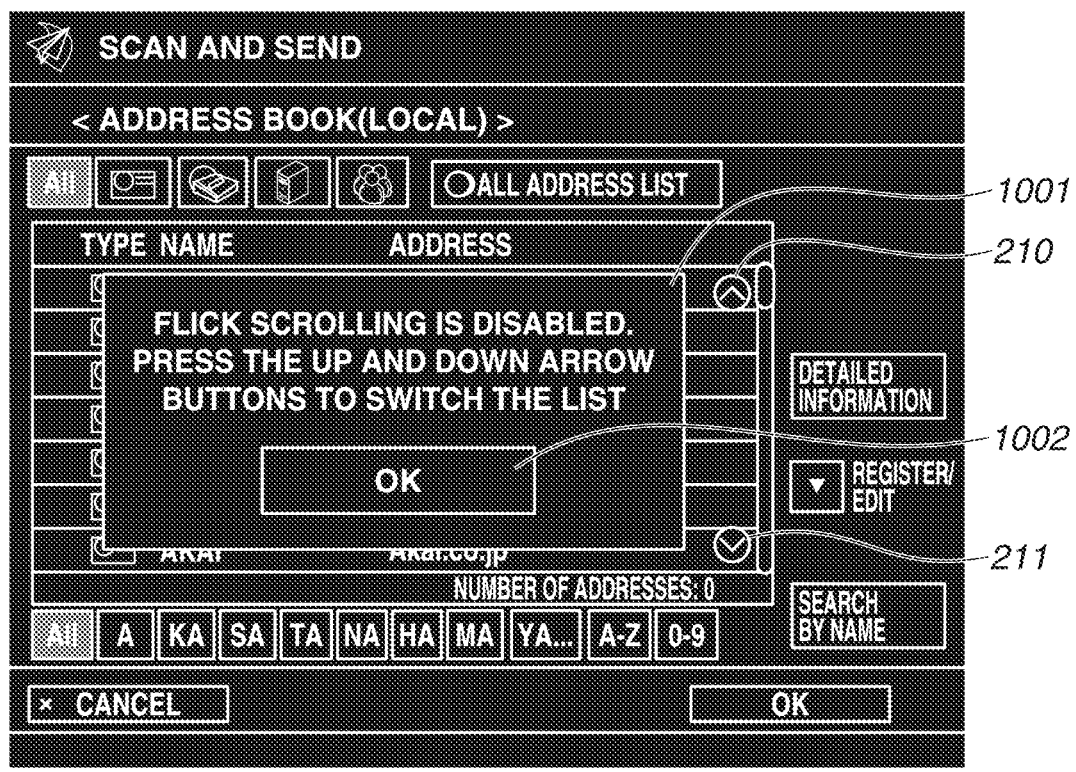
FIG. 10 is an example of a screen displayed on the display of the image processing apparatus according to one or more aspects of the present disclosure.

In the present exemplary embodiment, if it is determined that the scroll display processing is not enabled in step S604 of FIG. 6 (No in step S604), the CPU 111 pops up a notification screen 1001 on the screen of FIG. 4A to notify the user that the screen scrolling is disabled, as illustrated in FIG. 10. This allows the user to be made aware that screen scrolling based on flick and drag operations is disabled.

When the user confirms the information on the notification screen 1001 and then presses an OK button 1002, the notification screen 1001 is closed and the screen of FIG. 4A comes back. In one or more embodiments, the notification screen 1001 also displays information that the list displayed in the address display area 400 can be changed by operating the up or down arrow buttons 410 and 411. In other embodiments, instead of notifying the user that screen scrolling is disabled in response to a detection of a flick or drag operation, the screen of FIG. 4A displays information that screen scrolling is disabled, in advance.

A fourth exemplary embodiment will be described. In the above exemplary embodiments, the examples have been described in which, with screen color inversion enabled on the image processing apparatus 101, the screen is not scrolled even when a flick or drag operation is received. However, the screen being scroll is displayable in response to a flick or drag operation although the movement of content is slowed. In the present exemplary embodiment, an example will be described of scrolling the screen in response to a flick or drag operation even if screen color inversion is enabled. The basic configuration of the present exemplary embodiment is the same as the basic configuration of the first exemplary embodiment, and thus the differences will be described.

Figure 11:
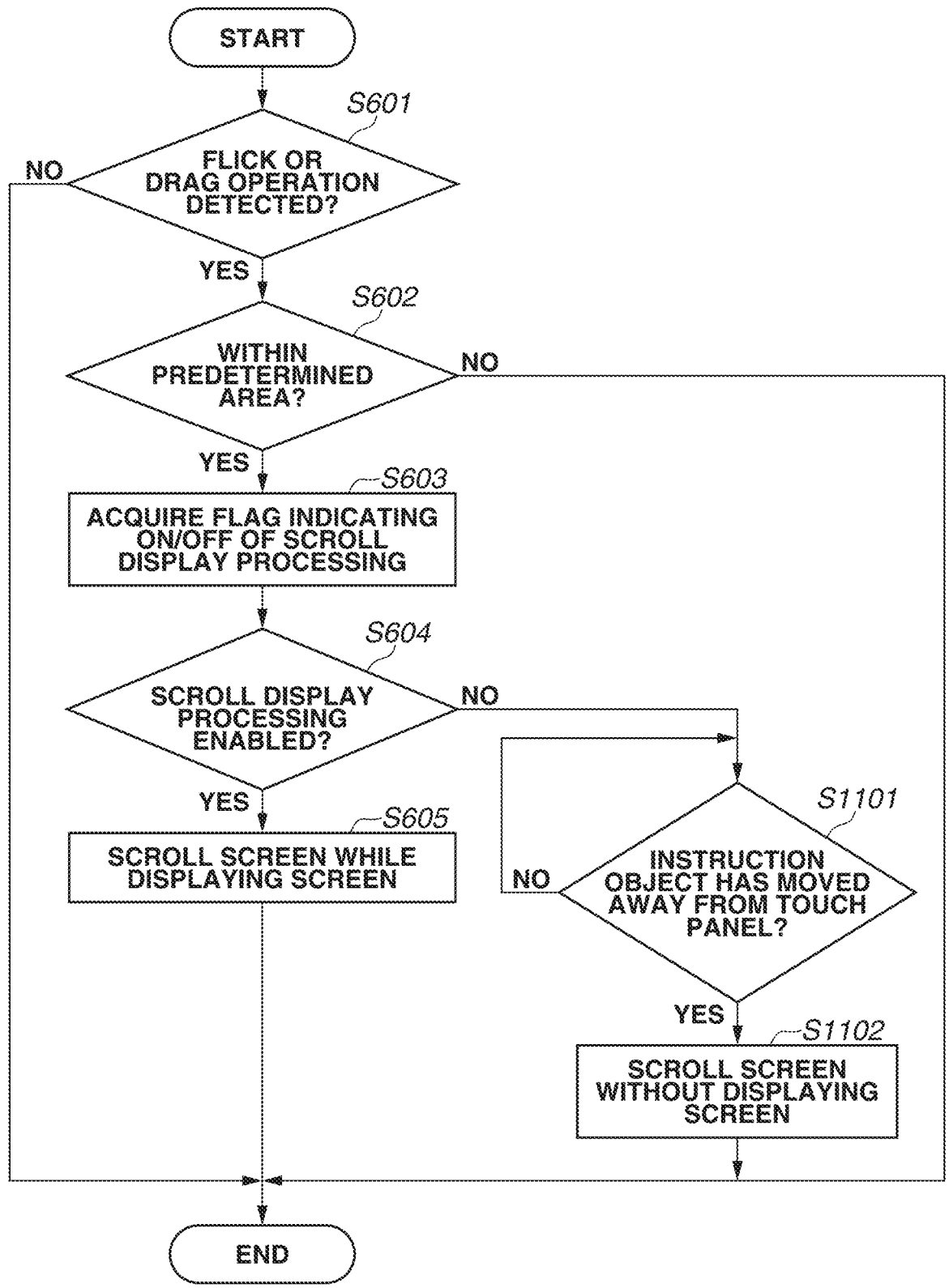
FIG. 11 is a flowchart illustrating processing executed by the image processing apparatus in detecting a touch operation according to one or more aspects of the present disclosure.

FIG. 11 is a flowchart illustrating processing executed in response to a detection of receiving a touch operation on the touch panel 119 by the CPU 111 of the image processing apparatus 101 according to the present exemplary embodiment. The flowchart in FIG. 11 has the same basic sequence as the basic sequence of the flowchart in FIG. 6, and thus the differences will be described.

If it is determined in step S604 that the scroll display processing is disabled (No in step S604), in step S1101, the CPU 111 determines whether an instruction object such as a finger in contact with the touch panel 119 has been removed off the touch panel 119. If it is determined that the instruction object has been removed (Yes in Step S1101), the processing proceeds to step S1102, otherwise (No in Step S1101), the processing of step S1101 is repeated.

In step S1102, the CPU 111 scrolls the screen. In doing that, the screen being scrolled is not displayed, and the screen is changed at a time. For example, the part of the list displayed in the address display area 400 in one page is switched to the part of the list in the next one page at a time. In one or more embodiments, instead of switching to the part of the list in the next one page, the part of the list displayed in the address display area 400 is changed according to the movement distance of a drag or flick operation.

Other Exemplary Embodiments

In each of the above embodiments, the description is given using a "list" displayed in a scrollable area as an example, but the application of the present disclosure is not limited to a list. In other embodiments, the present disclosure is applied to a "preview screen" fir displaying image data, a "text box" for displaying text data, and a "flickable panel" for switching the display with plural types of GUI components included.

In each of the above embodiments, the description has been made using the image processing apparatus 101, which has a plurality of functions such as a copy function and a scanner function, as an example. However, the present disclosure is also applicable to an image processing apparatus having some of these functions. In addition, the present disclosure is also applicable to other information processing apparatuses such as personal computers, personal digital assistants (PDAs), mobile phones, fax machines, cameras, video cameras, and other image viewers.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-129573, filed Jul. 30, 2020, which is hereby incorporated by reference herein in its entirety.

What is claimed is:

1. An image processing apparatus having a color inversion function to perform color inversion of a screen displayed on a display unit having a touch panel function, the image processing apparatus comprising:
    at least one computer-readable storage medium; and
    at least one processor,
    wherein the at least one processor and the at least one computer-readable storage medium are configured to:
    determine whether a graphics processing unit (GPU) included in the image processing apparatus is available;
    determine whether the color inversion function is enabled; and
    control the screen so as to be scrolled according to a predetermined user operation of moving an instruction object in contact with the display unit in response to a determination that the color inversion function is not enabled, and to control the screen so as not to be scrolled according to the predetermined user operation in response to a determination that the color inversion function is enabled,
    wherein, based on a determination that the GPU is available, the at least one processor and the at least one computer-readable storage medium are configured to control the screen so as to be scrolled according to the predetermined user operation even in a case where the determining determines that the color inversion function is enabled.

2. The image processing apparatus according to claim 1, wherein the predetermined user operation includes a flick operation.

3. The image processing apparatus according to claim 1, wherein the predetermined user operation includes a drag operation.

4. The image processing apparatus according to claim 1, wherein the at least one processor and the at least one computer-readable storage medium are further configured to notify a user that the screen cannot be scrolled, based on a receipt of the predetermined user operation and on the determination that the color inversion function is enabled.

5. The image processing apparatus according to claim 1, wherein the predetermined user operation is performed on a scrollable screen area.

6. The image processing apparatus according to claim 1, wherein the at least one processor and the at least one computer-readable storage medium are further configured to control the screen so as to be scrolled according to an operation different from the predetermined user operation even with the determination that the color inversion function is enabled.

7. The image processing apparatus according to claim 6, wherein the operation different from the predetermined user operation is pressing a predetermined button displayed on the display unit.

8. The image processing apparatus according to claim 6, wherein at least one processor and the at least one computer-readable storage medium are further configured to control the screen so as to be scrolled without displaying the screen being scrolled in the scrolling of the screen according to the operation different from the predetermined user operation.

9. The image processing apparatus according to claim 1, wherein, with the determination that the color inversion function is enabled, entirety of the screen displayed on the display unit is color-inverted.

10. The image processing apparatus according to claim 1, wherein the scrolling of the screen according to the predetermined user operation is scrolling of a list displayed in a partial area of the display unit.

11. The image processing apparatus according to claim 10, wherein the list displays an address included in an address book.

12. The image processing apparatus according to claim 1, wherein the image processing apparatus is configured to perform at least one of printing and scanning.

13. An image processing apparatus having a color inversion function to perform color inversion of a screen displayed on a display unit having a touch panel function, the image processing apparatus comprising:
    at least one computer-readable storage medium; and
    at least one processor,
    wherein the at least one processor and the at least one computer-readable storage medium are configured to:
    determine whether a graphics processing unit (GPU) included in the image processing apparatus is available,
    determine whether the color inversion function is enabled; and
    control the screen so as to be scrolled according to a predetermined user operation for scrolling the screen while displaying the screen being scrolled in response to a determination that the color inversion function is not enabled, and to control the screen so as to be scrolled without displaying the screen being scrolled according to the predetermined user operation in response to a determination that the color inversion function is enabled,
    wherein, based on a determination that the GPU is available, the at least one processor and the at least one computer-readable storage medium are further configured to control the screen so as to be scrolled while displaying the screen being scrolled according to the predetermined user operation even with the determination that the color inversion function is enabled.

14. The image processing apparatus according to claim 13, wherein the display of the screen being scrolled is a display to enable a user to identify a direction where content contained in the screen being scrolled moves.

15. The image processing apparatus according to claim 13, wherein the predetermined user operation includes a flick or drag operation.

16. The image processing apparatus according to claim 13, wherein the predetermined user operation includes an operation of pressing a button for scrolling the screen.

17. The image processing apparatus according to claim 13,
wherein the image processing apparatus displays a setting screen for receiving settings related to the color inversion function from a user, and
wherein the at least one processor and the at least one computer-readable storage medium are further configured to determine whether the color inversion function is enabled based on the settings received on the setting screen.

18. The image processing apparatus according to claim 13, wherein scrolling the screen means causing a part of content that is not displayed on the screen to be displayed on the screen.

19. A method for an image processing apparatus having a color inversion function to perform color inversion of a screen displayed on a display unit having a touch panel function, the method comprising:
determining whether a graphics processing unit (GPU) included in the image processing apparatus is available;
determining whether the color inversion function is enabled; and
controlling the screen so as to be scrolled while displaying the screen being scrolled according to a predetermined user operation for scrolling the screen in response to a determination in the determining that the color inversion function is not enabled, and controlling the screen so as to be scrolled without displaying the screen being scrolled according to the predetermined user operation in response to a determination in the determining that the color inversion function is enabled,
wherein, based on a determination by the determining that the GPU is available, the controlling controls the screen so as to be scrolled according to the predetermined user operation even in a case where the determination determines that the color inversion function is enabled.

* * * * *